United States Patent [19]
Kondo et al.

[11] Patent Number: 5,661,909
[45] Date of Patent: Sep. 2, 1997

[54] BLADE MOUNTING DEVICE IN CUTTING TOOL

[75] Inventors: Masayoshi Kondo; Kunio Amano; Katsufumi Takeda; Hideki Okubo, all of Anjo, Japan

[73] Assignee: Makita Corporation, Anjo, Japan

[21] Appl. No.: 565,722

[22] Filed: Nov. 30, 1995

[30] Foreign Application Priority Data

Dec. 2, 1994 [JP] Japan .................................. 6-299804
Dec. 22, 1994 [JP] Japan .................................. 6-320209

[51] Int. Cl.⁶ ............................................... B27B 19/09
[52] U.S. Cl. ....................................... 30/392; 279/53
[58] Field of Search ........................... 30/392, 393, 394; 83/699.21; 279/52, 53

[56] References Cited

U.S. PATENT DOCUMENTS

| | | | |
|---|---|---|---|
| 2,670,963 | 3/1954 | Osborn | 279/53 |
| 2,736,203 | 2/1956 | Shore | 279/53 |
| 3,795,980 | 3/1974 | Batson | 30/394 |
| 4,020,555 | 5/1977 | Hedrick | 30/392 |
| 4,021,914 | 5/1977 | Leibundgut et al. | 30/392 |
| 4,528,753 | 7/1985 | Kuhlmann et al. | 30/392 |
| 4,550,500 | 11/1985 | Kuhlmann et al. | 30/392 |
| 4,570,517 | 2/1986 | Souza et al. | |
| 4,610,088 | 9/1986 | Kuhlmann | 30/372 |
| 5,165,173 | 11/1992 | Miller | 30/392 |
| 5,306,025 | 4/1994 | Langhoff | 30/392 |
| 5,402,580 | 4/1995 | Seto et al. | 30/394 |
| 5,421,232 | 6/1995 | Laverick | 30/394 |

FOREIGN PATENT DOCUMENTS 1223793 7/1987 Canada .

*Primary Examiner*—Hwei-Siu Payer
*Attorney, Agent, or Firm*—Dennsion, Meserole, Pollack & Scheiner

[57] ABSTRACT

A blade mounting device is operable for mounting a blade on a movable member of a cutting member which is moved in a predetermined motion for a cutting operation. The blade mounting device includes a pair of claws mounted on the movable member and operable by an operator between a closed position for clamping the blade and an open position for releasing the blade. A first and a second thread mechanism are provided for converting the rotation of the actuation member into an axial movement of the actuation member relative to the movable member and for converting the rotation of the actuation member into an axial movement of the claws relative to the actuation member.

22 Claims, 12 Drawing Sheets

BLADE MOUNTING DEVICE IN CUTTING TOOL

BACKGROUND OF THE INVENTION

1. Field of the Invention

The present invention relates to a blade mounting device in a cutting tool.

2. Description of the Prior Art

In a conventional reciprocating cutting tool such as a jig saw and a reciprocating saw, a blade is frequently changed in accordance with the thickness and other factors of a work to be cut. If hand tools such as spanners or screwdrivers are required for changing the blade, much time is required to operate such hand tools. Thus, the operation of such hand tools is troublesome. In addition, the operation of such hand tools involves a problem that the hand tools are liable to be lost. For this reason, this kind of cutting tool should preferably require no hand tools for changing the blade. In order to solve this problem, a blade mounting device has been proposed in U.S. Pat. No. 5,165,173.

The construction of the above U.S. patent will now be explained with reference to FIGS. 11 and 12.

As shown in FIG. 11 which corresponds to FIG. 2 of the U.S. patent, an end cap 107 is secured to one end of a drive shaft 103 which is reciprocally driven in an axial direction. A pair of diametrically opposed entry slots 108 and a pair of diametrically opposed retention grooves 109 are formed in the end cap 107. The retention grooves 109 are circumferentially displaced by an angle of 90° from the entry slots 108. A locking member 113 is disposed inside of the drive shaft 103 and is vertically movable relative to the drive shaft 103. The locking member 113 is normally biased in a downward direction by a compression spring 114. A slot 112 is formed in the locking member 113 for permitting insertion of a part of a blade B between bayonet lugs Ba and an upper end Bt of the blade B. When the upper end Bt of the blade B is brought to abut on the locking member 113 at the upper end of the slot 112, the downward biasing force of the compression spring 114 is applied to the blade B.

With this construction, the blade B is inserted into the end cap 107 with the bayonet lugs Ba being in alignment with the entry slots 108, and the blade B is thereafter rotated by an angle of 90° so as to bring the bayonet lugs Ba in alignment with the retention grooves 109. Then, the blade B is pressed downwardly by the compression spring 114 and the bayonet lugs Ba are brought to engage the retention grooves 109 so as to be retained therein. Thus, the blade B is mounted on the drive shaft 103 not to be extracted downwardly therefrom. Here, a pair of outwardly extending lugs 113a are formed on the lower end of the locking member 113. In the mounting state of the blade B as described above, the lugs 113a are brought to engage the entry slots 108 so as to prevent the blade B as well as the locking member 113 from rotation.

In order to remove the blade B from the drive shaft 103, the locking member 13 is lifted by moving a lever to an unlocking position. The lever is connected to the locking member 113 via a tension member 118. Thus, the lugs 113a are disengaged from the entry slots 108 against the biasing force of the compression spring 114, and in this state, the blade B can be rotated. The blade B is then rotated by an angle of 90° to disengage the bayonet lugs Ba from the retention grooves 109 and to bring the bayonet lugs Ba in alignment with the entry slots 108, so that the blade B can be removed.

After removing the blade B, another blade B is inserted into the end cap 107 and is rotated by an angle of 90°, so that its bayonet lugs Ba are brought into alignment with the retention grooves 109. When the lever is moved to a locking position, the blade B is pressed downwardly by the compression spring 114 via the locking member 113, so that the bayonet lugs Ba are brought to engage the retention grooves 109. Another blade B can be thus mounted on the drive shaft 103.

In order to hold the bayonet lugs Ba of the blade B in the engaging position with the retention recesses 109, the U.S. patent proposes an alternative construction as shown in FIG. 12 which corresponds to FIG. 5 of the U.S. patent.

In the embodiment shown in FIG. 12, a lock screw 128 is inserted into the drive shaft 103 and is in engagement with a female thread formed on an inner peripheral surface of the drive shaft 103, so that the upper portion of the blade B can be pressed or released by the axial movement of the lock screw 128. The screw 128 has an extension 129 extending upwardly from the screw 128 and having a semi-circular configuration in section. A screw rotating member 130 is also inserted into the drive shaft 103 and has a semi-circular configuration in section similar to the extension 129. The extension 129 and the screw rotating member 130 have confronting and mutually sliding flat surfaces. The screw rotating member 130 however is not threadably engaged with the drive shaft 103. Therefore, when the screw rotating member 130 is rotated by means of an operation knob 137, the extension 129 is rotated together with the screw rotating member 130. The screw 128 is then rotated together with the extension 129, so that it is moved to press the upper end Bt of the blade B or to release the same. Although the screw rotating member 130 is rotated, it does not move in an axial direction. Therefore, only the extension 129 as well as the screw 128 is moved in the axial direction with its flat end slidably abutting on the flat surface of the extension 129.

Although the above blade mounting device of the U.S. patent permits the blade B to be mounted and removed without using hand tools, the device can only be applicable to a blade B having the bayonet lugs Ba. Therefore, this device is inconvenient in that the device cannot be applied to blades of different types.

More specifically, other than the blade having bayonet lugs which are adapted to be engaged by the drive shaft as described above (hereinafter called "lug-type blade"), the prior art has used a blade having a through-hole formed on its upper end for inserting a protrusion which serves to prevent the blade from removal (hereinafter called "hole-type blade"). The blade of the latter type cannot be mounted on the device of the U.S. patent since it does not include any parts for engagement with the retention grooves 109.

In addition, with the device of the U.S. patent, the mounting operation of the blade is very troublesome since it requires to rotate the blade B by an angle of 90° so as to bring the bayonet lugs Ba into alignment with the retention grooves 109 for engagement therewith after the blade B has been inserted into the end cap 107.

Further, with the construction shown in FIG. 12 where the blade B is fixed in position by the lock screw 128 which is rotated to press the upper portion of the blade B, since the lock screw 128 is axially moved by a distance of its one pitch through each one rotation of the operation knob 137, the operation knob 137 must be rotated several times for moving the lock screw 128 by a distance corresponding to several pitches which is sufficient for changing the blade B. Therefore, this construction involves the problem that much time is required for changing the blade. Other than the mounting device as described above, this problem is also caused in a mounting device in which a lock screw for fixing the blade is rotated by a hand tool such as a screwdriver.

The amount of movement of the lock screw 128 for one rotation of the operation knob 137 can be increased by merely increasing pitch of the lock screw 128, and the above problem can be solved to some extent. However, as the pitch increases, the lock screw 128 tends to be loosened by vibration and other external forces, so that the mounting state of the blade B becomes unstable. Therefore, this solution is not desirable.

SUMMARY OF THE INVENTION

It is, accordingly, an object of the present invention to provide a blade mounting device which is improved in operability.

It is also an object of the present invention to provide a blade mounting device which may reliably fix a blade in position;

It is a further object of the present invention to provide a blade mounting device which may easily fix and release a blade;

It is a still further object of the present invention to provide a blade mounting device which may quickly fix and release a blade.

According to a first aspect of the present invention, there is provided a blade mounting device for mounting a blade on a movable member of a cutting tool which is moved in a predetermined motion for a cutting operation, comprising:

a pair of claws mounted on the movable member and operable between a closed position for clamping the blade and an open position for releasing the blade; and an actuation mechanism operable by an operator for moving the claws between the closed position and the open position.

According to a second aspect of the present invention, there is provided a blade mounting device for mounting a blade on a movable member of a cutting tool which is moved in a predetermined motion for a cutting operation, comprising:

a pair of claws mounted on the movable member and operable between a closed position for clamping the blade and an open position for releasing the blade;

an actuation mechanism operable by an operator for moving the claws between the closed position and the open position; and a biasing device for normally biasing the claws toward the open position.

According to a third aspect of the present invention, there is provided a blade mounting device for mounting a blade on a movable member of a cutting tool which is moved in a predetermined motion for a cutting operation, comprising:

a holder mounted on the movable member and movable relative to the movable member in an axial direction between a first position to hold the blade and a second position to release the blade; and an actuation mechanism operable by an operator for operating the holder;

the actuation mechanism including:

an actuation member rotatably operable by the operator; and a thread mechanism for converting the rotational movement of the actuation member into an axial movement of the holder;

the thread mechanism including:

a first thread mechanism disposed between the actuation member and the movable member for converting the rotation of the actuation member into the axial movement of the actuation member relative to the movable member; and a second thread mechanism disposed between the actuation member and the holder for converting the rotation of the actuation member into the axial movement of the holder relative to the actuation member.

The invention will become more fully apparent from the claims and the description as it proceeds in connection with the drawings.

DETAILED DESCRIPTION OF THE PREFERRED EMBODIMENTS

A first embodiment of the present invention will now be described with reference to FIGS. 1 to 4.

Figures 1, 1A:
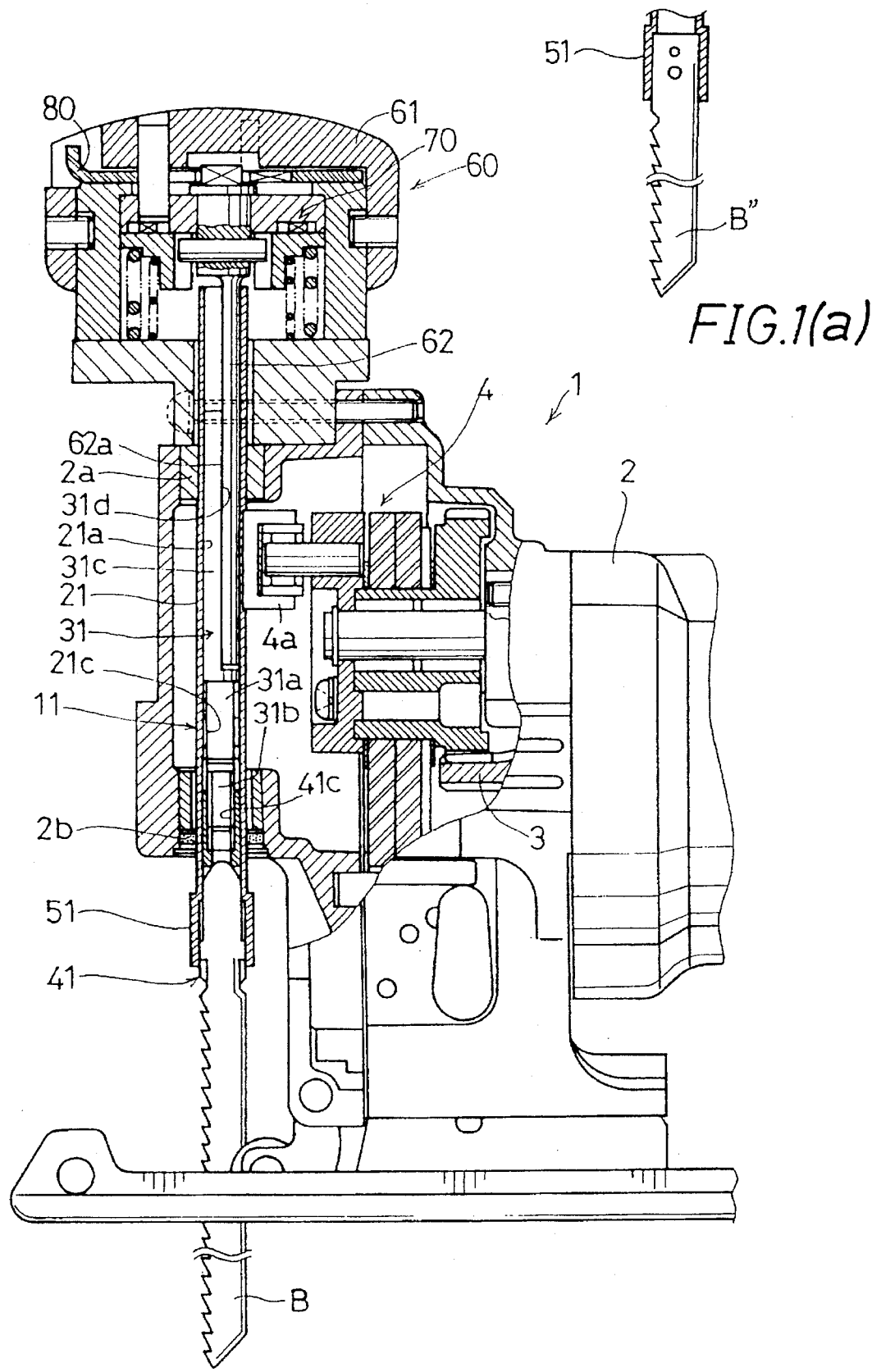
FIG. 1 is a vertical sectional view of a jig saw incorporating a blade mounting device according to a first embodiment of the present invention.
FIG. 1(a) is a view of a part of the mounting device shown in FIG. 1 and illustrates the mounting state of a blade having no lateral lugs.

Referring to FIG. 1, there is shown the overall view of a jig saw 1 incorporating a blade mounting device 11 of the present invention.

The jig saw 1 has a housing 2 in which a motor having an output shaft 3 and acting as a drive source is accommodated. The rotation of the output shaft 3 of the motor is converted into a vertical reciprocal movement of a tubular rod 21 by means of a motion conversion mechanism 4. The rod 21 is supported on a front portion of the housing by means of bearings 2a and 2b, so that the rod 21 can be vertically slidably moved relative to the housing 2.

Figure 2:
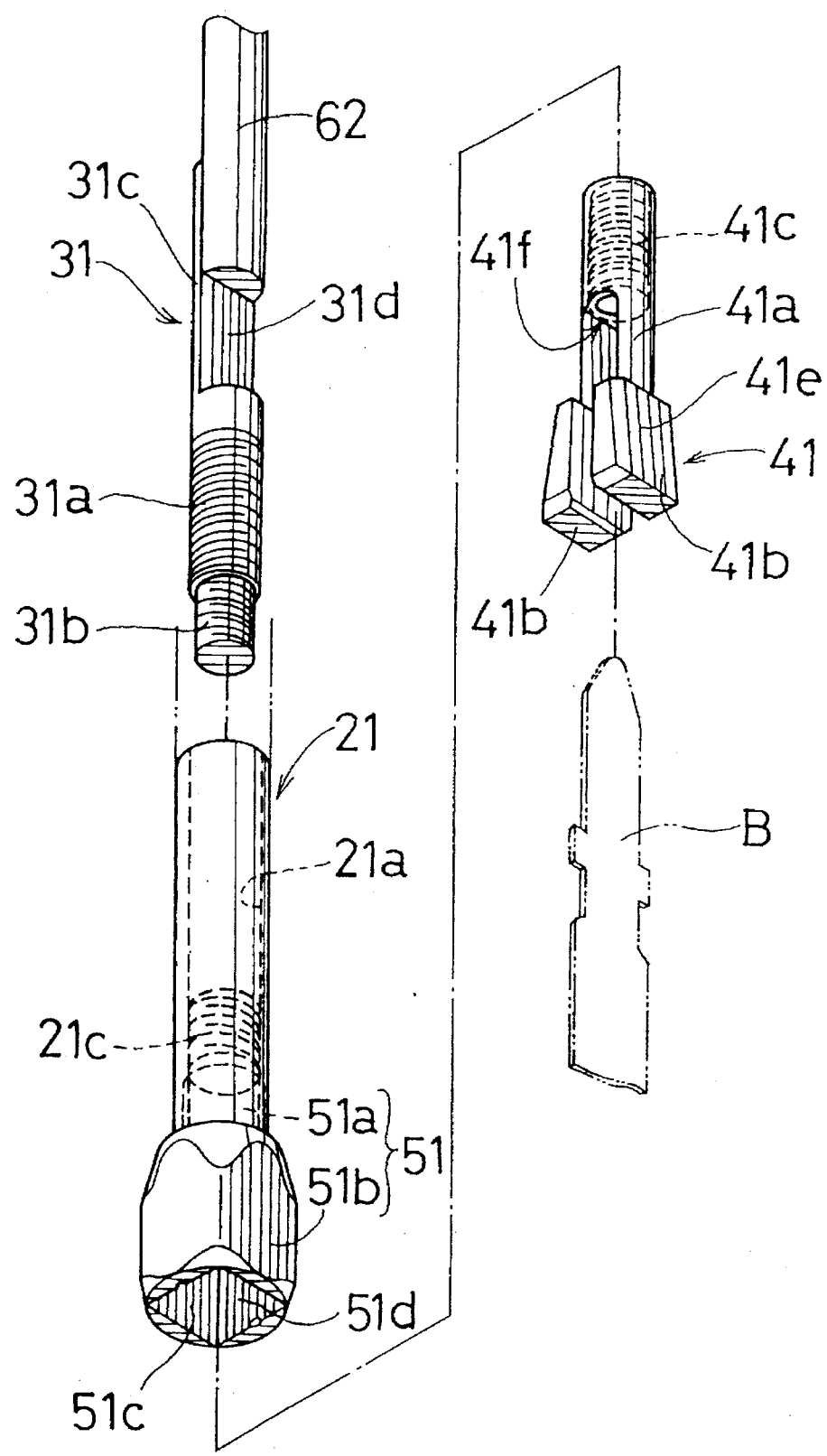
FIG. 2 is an exploded perspective view of the blade mounting device shown in FIG. 1.
Figure 3:
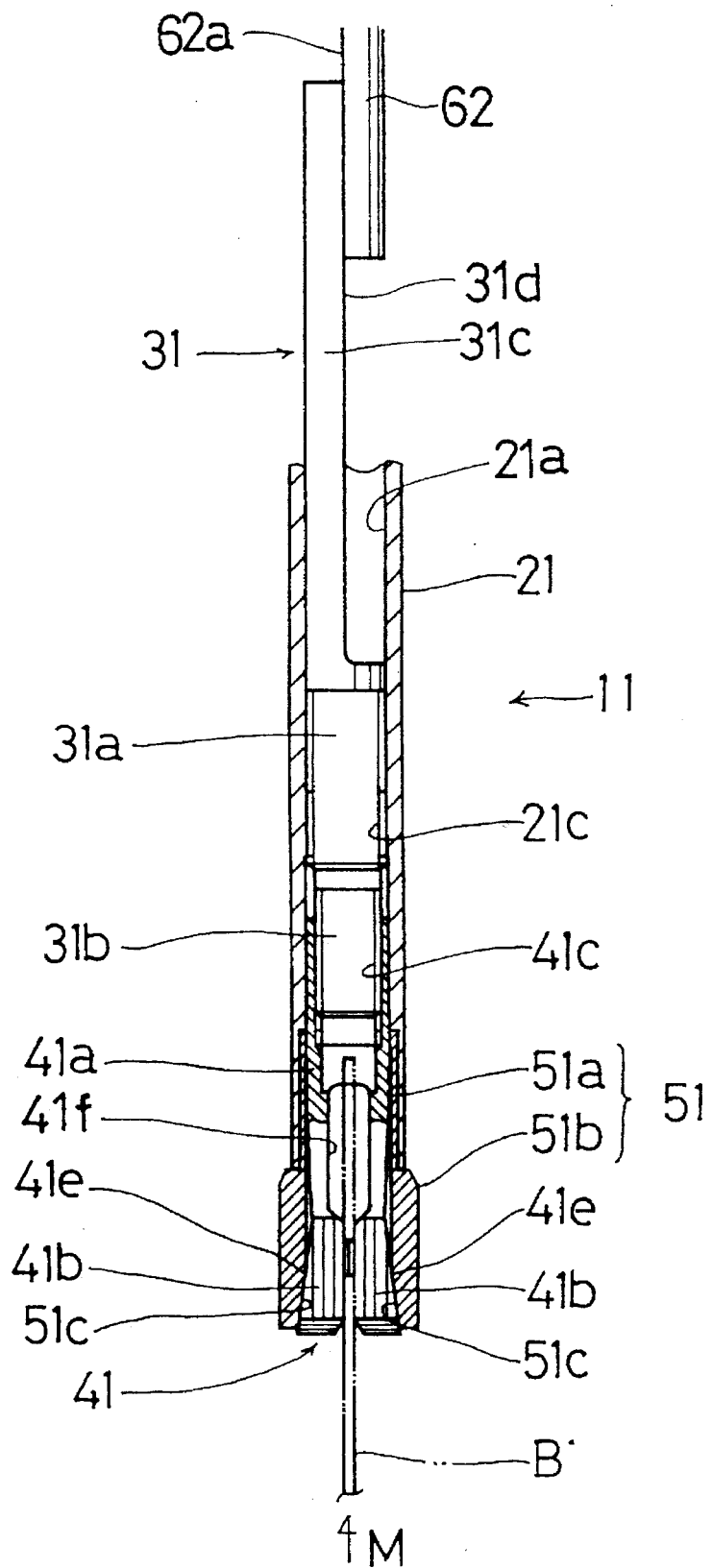
FIG. 3 is a sectional front view of the blade mounting device shown in FIG. 1.

As shown in FIGS. 2 and 3, the blade mounting device 11 generally includes the rod 21 as described above, an actuation rod 31 inserted into an axial hole 21a of the rod 21, a clamping claw 41 for clamping a blade B, and a cap 51 which serves to open and close the clamping claw 41. The actuation rod 31 is rotatable around the same axis as the rod 21 and is movable in the axial direction of the rod 21.

The blade mounting device 11 is operable by rotating an operation knob 61 of an operation mechanism 60 positioned on the upper portion of the body 2.

A roller guide 4a which forms the motion conversion mechanism 4 is secured to the rod 21 in a substantially central position of the rod 21 in its longitudinal direction. The roller guide 4a extends perpendicular to the axial direction of the rod 21. The axial hole 21a is formed throughout the length of the rod 21 and includes a left-hand thread hole 21c formed in substantially the central position in the axial direction of the axial hole 21a. The cap 51 is mounted on the lower end of the rod 21 as will be explained later.

The diameter of the actuation rod 31 is determined such that the actuation rod 31 is insertable into the axial hole 21a of the rod 21. The actuation rod 31 has a left-hand male thread part 31a and a right-hand male thread part 31b having the same axis with each other. The right-hand thread part 31b has a diameter smaller than a diameter of the left-hand thread part 31a and is positioned on the lower side of the left-hand thread part 31a. The upper part of the actuation rod 31 positioned above the left-hand male thread part 31a has a semi-circular configuration in section to form a semi-circular rod part 31c. The actuation rod 31 thus constructed is inserted into the rod 21 from the upper side of the rod 21, so that the left-hand thread part 31a is engaged with the left-hand thread hole 21c of the axial hole 21a and that the right-hand thread part 31b is positioned downwardly beyond the left-hand thread hole 21c and is brought to engage a right-hand thread hole 41c formed in a cylindrical shaft portion 41a of the clamping claw 41.

The clamping claw 41 has a fork-like configuration and includes a pair of claw portions 41b formed on the lower end of the cylindrical shaft portion 41a and opposed to each other in the diametrical direction of the cylindrical shaft portion 41a. The claw portions 41b have flat surfaces confronting each other and extending in parallel to the axial direction of the cylindrical shaft portion 41a. The claw portions 41b have inclined surfaces 41e on the sides opposite to the flat surfaces. The inclined surfaces 41e are inclined relative to the axial direction of the cylindrical shaft portion 41a at the same inclination angle with each other, so that the distance between the inclined surfaces 41e is increased in the downward direction. A recess 41f is formed in the cylindrical shaft portion 41a at a position adjacent the claw portions 41b so as to provide resiliency in a direction to open the claw portions 41b. The cylindrical shaft portion 41a is axially movably inserted into the axial hole 21a of the rod 21 via a cylindrical tubular portion 51a of the cap 51. The right-hand thread hole 41c is formed in the upper end of the cylindrical shaft portion 41a. With the cylindrical shaft portion 41a inserted into the axial hole 21a of the rod 21, the claw portions 41b are positioned within the cap 51, and the right-hand thread part 31b of the rod 31 is in engagement with the right-hand thread hole 41c formed in the upper end of the cylindrical shaft portion 41a.

The construction of the cap 51 which serves to open and close the claw portions 41b of the clamping claw 41 will now be explained.

Figure 4:
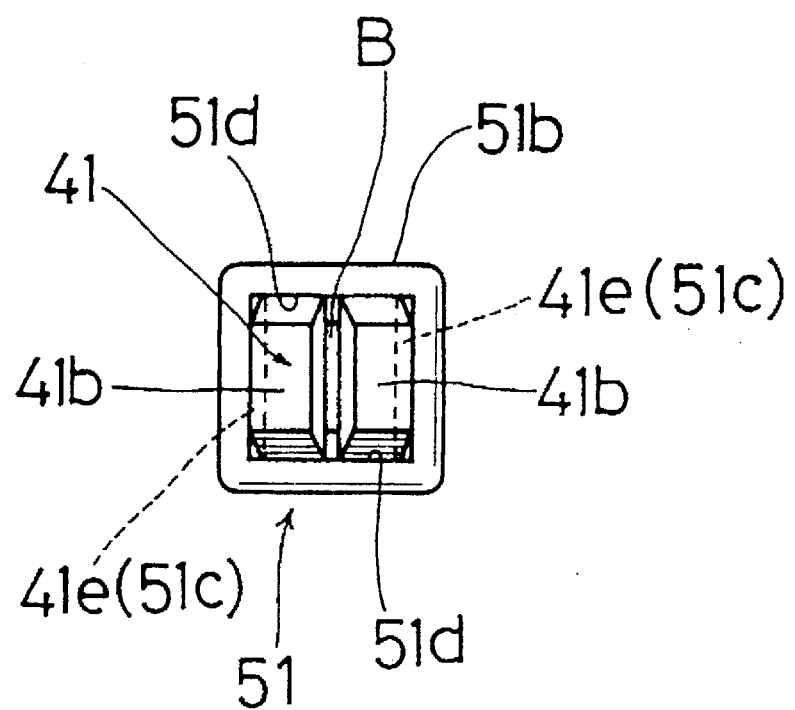
FIG. 4 is a bottom view of the blade mounting device, taken in the direction of arrow M in FIG. 3.

The cap 51 has the cylindrical tubular portion 51a on its upper half part and has a rectangular tubular portion 51b on its lower half part (see FIG. 4). The cylindrical tubular portion 51a is closely fitted into the axial hole 21a at the lower end of the rod 21 and secured thereto. The rectangular tubular portion 51b receives claw portions 41b therein and has a pair of opposed inner walls having inclined surfaces 51c formed thereon and confronting the inclined surfaces 41e. The inclined surfaces 51c have the same inclination angle as the inclined surfaces 41e and are in slidable contact therewith, so that the claw portions 41b are moved to be opened and closed under the guide of the inclined surfaces 51c.

The construction of the operation mechanism 60 will now be explained.

A rotary rod 62 is positioned above the actuation rod 31 and has a semi-circular configuration in section corresponding to the configuration of the semi-circular rod portion 31c of the actuation rod 31. The rotary rod 62 is rotatable around the same axis as the actuation rod 31 and is inserted into the axial hole 21a of the rod 21, so that a flat surface 62a of the rotary rod 62 is in sliding contact with a flat surface 31d of the semi-circular rod portion 31c. With this construction, when the rotary rod 62 is rotated, the actuation rod 31 is rotated together with the rotary rod 62. However, since the flat surfaces 62a and 31d are in slidable contact with each other, the actuation rod 31 can be moved in the axial direction independently of the rotary rod 62 which is fixed in position in the axial direction.

The upper portion of the rotary rod 62 is connected to the operation knob 61 via a torque limiter 70 and a lock plate 80. When a torque applied to the rotary rod 62 exceeds a predetermined value in the closed state of the claw portions 41b, the torque limiter 70 disconnects the rotary rod 62 from the operation knob 61, so that the rotary rod 62 is prevented from being damaged. The lock plate 80 is slidably mounted on the operation knob 61 and is movable between a locking position and a releasing position in a direction perpendicular to the axial direction of the rotary rod 62. At the locking position shown in FIG. 1, the lock plate 80 disconnects the rotary rod 62 and the operation knob 61 from each other. When the lock plate 80 is pulled leftwardly to reach the releasing position, the rotary rod 62 and the operation knob 61 are connected to each other for rotation together. Therefore, when the lock plate 80 is in the releasing position shown in FIG. 1, the rotation of the operation knob 11 is not transmitted to the rotary rod 62, so that the blade mounting device 11 cannot be operated to release the blade B. The operation knob 61 also serves as a grip portion to be grasped by the operator during a cutting operation. Since in the releasing position, the lock plate 80 is pushed into the operation knob 11, the blade mounting device 11 is prevented from malfunction during the cutting operation with the operation knob 61 grasped by the operator. By rotating the operation knob 61 with the lock plate 80 pulled for connection between the operation knob 61 and the rotary rod 62, the actuation rod 31 as well as the rotary rod 62 is rotated, so that the blade mounting device 11 can be operated to clamp or release the blade B.

With the blade mounting device 11 of this embodiment, the operation for clamping and releasing the blade B is performed as follows:

In the state where the blade B is not mounted, the clamping member 41 is lowered from the position shown in FIG. 1 by a predetermined distance, so that the claw portions 41b are free from the inclined surfaces 51c of the cap 51 and are opened by virtue of the resilient force produced by the recess 41f.

With the claw portions 41b thus opened, the operator inserts the head of the blade B between the claw portions 41b until the head abuts on the lower end of the cylindrical shaft portion 41a of the clamping claw 41 as shown in FIG. 1. In case of a blade B" having no lateral lugs Ba, the blade B" is inserted until the upper end of the blade B" abuts on the stepped portion formed in the cap 51 as shown in FIG. 1(a). More specifically, the stepped portion is formed between the cylindrical portions 51a and 51b (see FIG. 3).

Since the claw portions 41b are held in the open position by the resilient force, the operation for inserting the blade B can be easily performed. Thereafter, the operator rotates the operation knob 61 in a right-hand direction, so that the actuation rod 31 is rotated together with the rotary rod 62 in the right-hand direction. As the actuation rod 31 is rotated in the right-hand direction, it is moved upwardly relative to the rod 21 by an anti-screwing movement of its left-hand thread part 31a relative to the left-hand thread hole 21c of the rod 21. With this movement of the actuation rod 31, the clamping claw 41 also moves upwardly together with the actuation rod 31.

Here, the claw portions 41b are prevented from rotation by the confronting inner walls 51d, so that the clamping claw 41 does not rotate with the actuation rod 31 although it moves vertically together with the actuation rod 31. Therefore, as the actuation rod 31 is rotated in the right-hand direction, the right-hand thread part 31b of the actuation rod 31 is screwed into the right-hand thread hole 41c of the clamping claw 41, so that the clamping claw 41 moves upwardly relative to the actuation rod 31.

Thus, as the actuation rod 31 is rotated in the right-hand direction, the actuation rod 31 moves upwardly relative to the rod 21, and the clamping claw 41 is also moved upwardly relative to the actuation rod 31. As the result, the clamping claw 41 is moved upwardly relative to the rod 21 by a distance corresponding to the sum of the distance of movement of the actuation rod 31 relative to the rod 21 and the distance of movement of the clamping claw 41 relative to the actuation rod 31. This means that the clamping claw 41 is moved a greater distance by slightly rotating the operation knob 61, resulting in that the claw portions 41b can be quickly opened and closed. For this reason, two thread parts 31a and 31b provided on the actuation rod 31 function not only merely a shifting mechanism of the clamping claw 41 but also function as a speed increasing mechanism for increasing the shifting distance of the clamping claw 41. Such a speed increasing function is performed not only when the clamping claw 41 is moved upwardly for clamping the blade B but also when the clamping claw 41 is moved downwardly for releasing the blade B as will be explained later.

As the clamping claw 41 is moved upwardly as described above, the claw portions 41b are gradually forced to be moved radially inwardly toward the closed position by the cooperation between their inclined surfaces 41e and the inclined surfaces 51c of the cap 51, so that the head of the blade B which has been inserted between the claw portions 41b are clamped and are fixed in position.

In order to release the blade B from the clamping claw 41, the operator rotates the operation knob 61 in the reverse direction or a left-hand direction. As the operation knob 61 is rotated in the left-hand direction, the actuation rod 31 is rotated by the rotary rod 62 in the left-hand direction, so that the actuation rod 31 is moved downwardly relative to the rod 21 by a screwing movement of its left-hand thread part 31a relative to the left-hand thread hole 21c of the rod 21. With this movement of the actuation knob 31, the clamping claw 41 also moves downwardly together with the actuation rod 31. In addition, by virtue of an anti-screwing movement of the right-hand thread part 31b of the actuation rod 31 relative to the right-hand thread hole 41c of the clamping claw 41, the clamping claw 41 moves downwardly relative to the actuation rod 31. As the result, the clamping claw 41 moves downwardly relative to the rod 21 by a distance which corresponds to the sum of the distance of the downward movement of the actuation rod 31 relative to the rod 21 and the distance of downward movement of the clamping claw 41 relative to the actuation rod 31. As the clamping claw 41 is thus moved downwardly, the claw portions 41b become free from the inclined surfaces 51c of the cap 51, so that they reliably return to move radially outwardly toward the open position by the resilient force which has been imparted by the recess 41f as described above. When the claw portions 41b are thus opened, the blade B falls spontaneously. Otherwise, the operator can easily remove the blade B by pulling it downwardly.

As described above, with this embodiment, by virtue of the speed increasing mechanism constituted by two threaded parts 31a and 31b formed on the actuation rod 31, the clamping claw 41 can be moved relative to the rod 21 by a distance which corresponds to the distance of movement of the actuation rod 31 relative to the rod 21 and the distance of movement of the clamping claw 41 relative to the actuation rod 31. For this reason, by slightly rotating the operation knob 61, the claw portions 41b can be moved a great distance for clamping and releasing the blade B. The blade mounting device 11 of this embodiment is therefore improved in operability.

In addition, since the blade B can be mounted and removed by rotating the operation knob 61 for opening and closing the claw portions 41b, the mounting and releasing operation of the blade B can be made without using a special hand tool such as a screwdriver and a spanner.

Further, since the blade B is clamped between the claw portions 41b in a direction of its thickness, other than the blade B having lugs formed on both lateral sides of the head as shown in the drawings, any type of blade such as the blade B" shown in FIG. 1(a) can be applied to the mounting device 11 as long as it has a head having a configuration insertable between the claw portions 41b.

Furthermore, since the blade B is clamped between the claw portions 41b, the mounting and removing operation of the blade B can be performed by only inserting the blade B into the claw portions 41b and by pulling out the blade B from the claw portions 41b, the operability or easiness in handling is improved. In addition, the mounting device 11 can cope with various kinds of blades having different thickness as long as the thickness is within a predetermined range.

The above embodiment may be modified such that the thread parts 31a and 31b on the actuation rod 31 have different pitches from each other. In addition, both the thread parts 31a and 31b may have the same threaded direction while having different pitches from each other, so that the clamping claw 41 may be moved by a distance corresponding to the difference in pitches for each rotation. In such a case, depending on which of the thread parts 31a and 31b has a greater pitch, the inclining direction of the inclined surfaces 41e of the clamping claw 41 and the inclined surfaces 51c of the cap 51 is determined between the downwardly closing direction and downwardly opening direction. For example, if the thread part 31a is a right-hand thread having a pitch of 3 mm and the threaded part 31b is a right-hand thread having a pitch of 1 mm, when the operation knob 61 is rotated in the right-hand direction by one rotation, the clamping claw 41 moves downwardly by a distance of 2 mm. Therefore, in such a case, the inclined surfaces 41e of the clamping claw 41 and the inclined surfaces 51c of the cap 51 are inclined in the downwardly closing direction for closing the claw portions 41b to clamp the blade B.

In consideration of the operability in a normal condition, it is preferable that, as in the above embodiment, the blade B is clamped when the operation knob 61 is rotated in the right-hand direction, while the blade B is released when the operation knob 61 is rotated in the left-hand direction. However, the blade B may be clamped and released when the operation knob 61 is rotated in the left-hand direction and the right-hand direction, respectively.

As will be understood from the above description, this embodiment includes two improvements, one of which is the provision of a clamping claw 41 for clamping the blade B in the direction of thickness through cooperation with the cap 51, and the other of which is the provision of two thread parts 31a and 31b on the actuation rod 31 for increasing the operation speed of the clamping claw 41.

Although both these improvements have been incorporated in the above embodiment, these improvements serve to improve the operability of the blade mounting device independently of each other. Therefore, the above embodiment may be modified such that only one of the improvements are provided.

Figure 11:
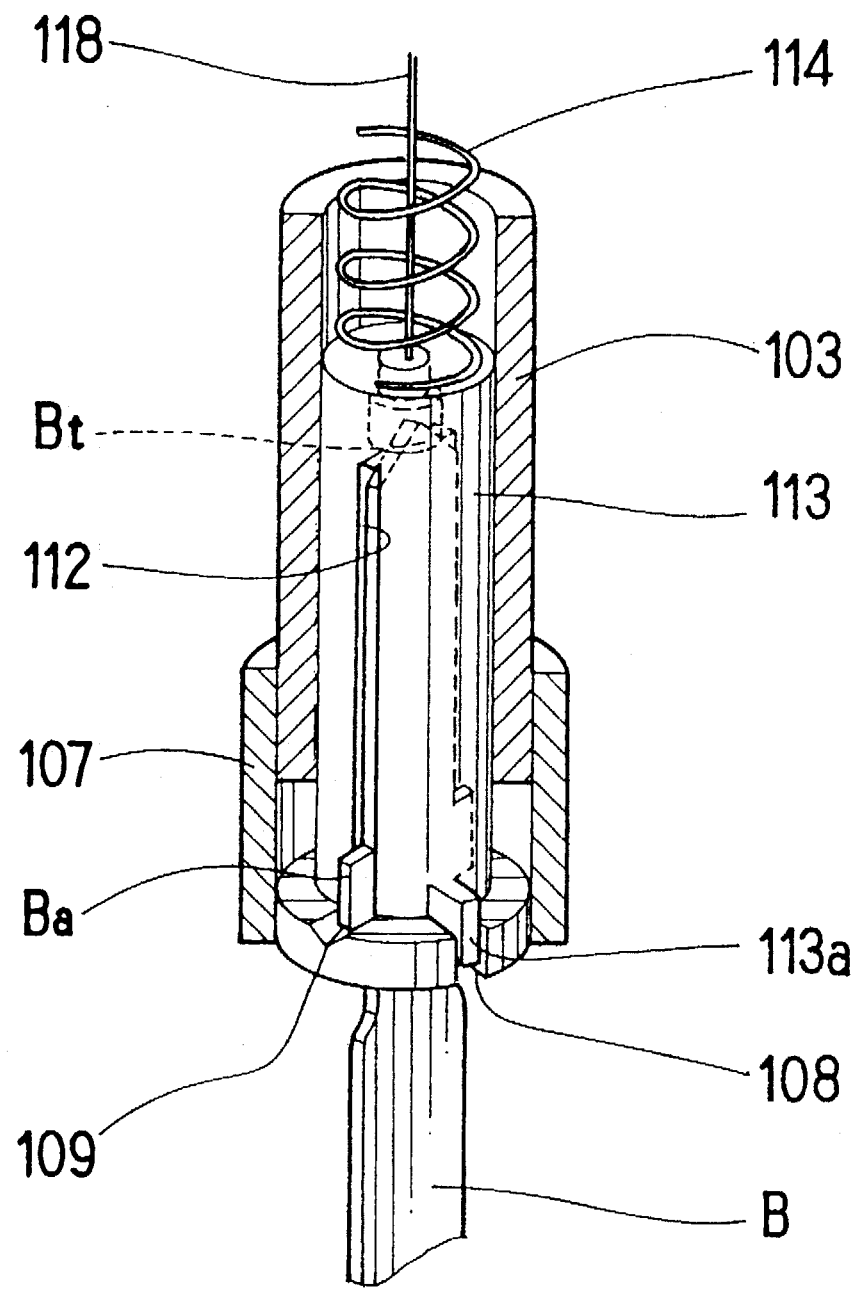
FIGS. 11 and 12 are views showing conventional blade mounting devices.
Figure 12:
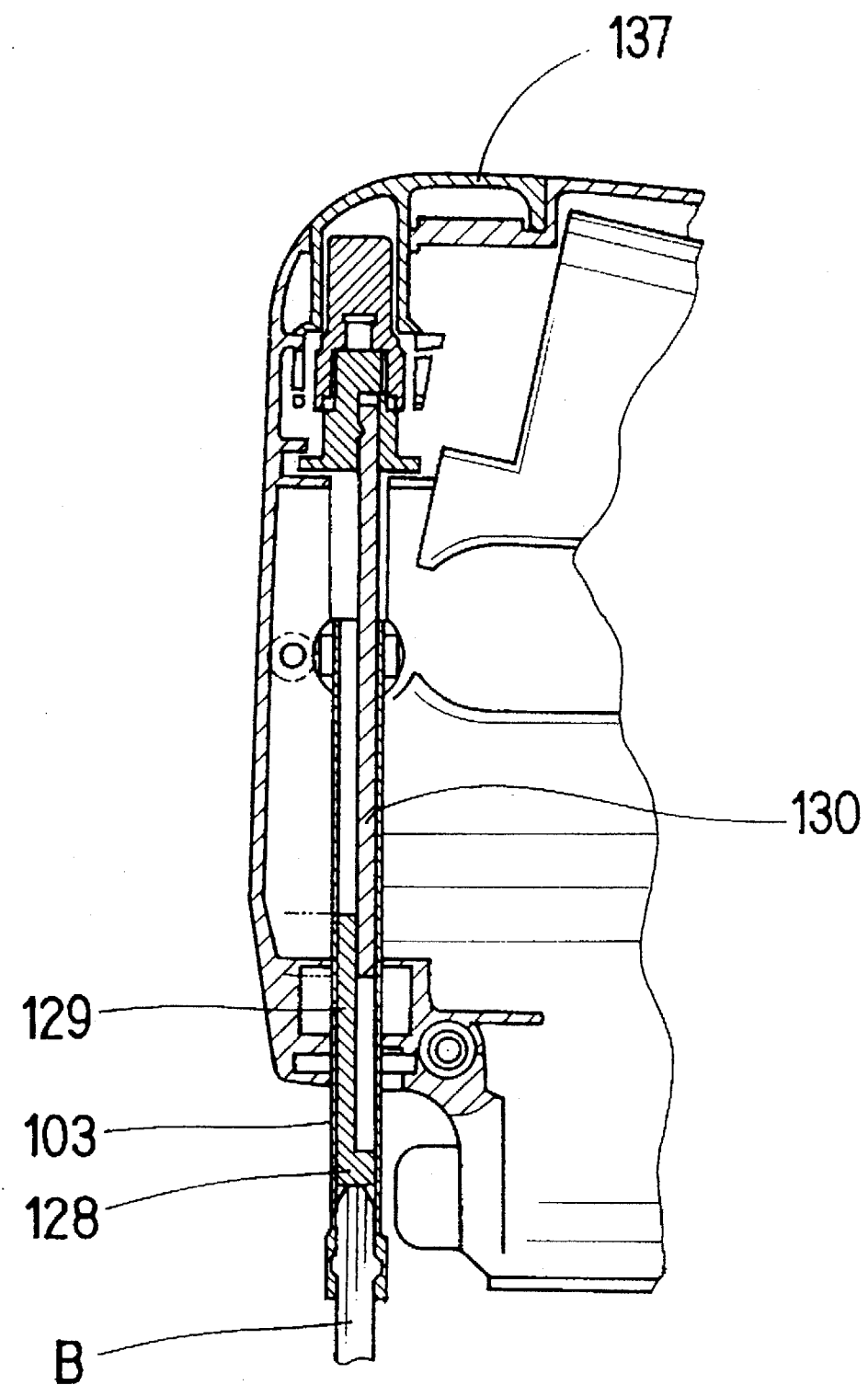

For example, when the improvement of the provision of two thread parts 31a and 31b has been incorporated, the clamping claw 41 and the cap 51 may be replaced by a holder mechanism which is operable to engage lugs formed on both lateral sides of a head of a blade and to press the head downwardly as disclosed in connection with the conventional mounting device in connection with FIGS. 11 and 12.

On the other hand, when the improvement of the clamping claw 41 and the cap 51 has been incorporated, the thread part 31b and the threaded hole 41c may be replaced by an appropriate joint mechanism which rotatably connects between the actuation rod 31 and the clamping claw 41.

Of course, it will be preferable that both the improvements are incorporated as in this embodiment.

A blade mounting device according to a second embodiment of the present invention will now be explained with reference to FIGS. 5 to 9.

A blade mounting device 10 of this embodiment is a modification of the blade mounting device 11 of the first embodiment and mainly includes a rod 20, an actuation rod 30, a clamping claw 40 and a cap 50 corresponding to the rod 21, the actuation rod 31, the clamping claw 41 and the cap 51 of the first embodiment, respectively.

This embodiment is different from the first embodiment mainly in the following points:

(1) The directions of thread parts 30a and 30b formed on the actuation rod 30 are opposite to those of thread parts 31a and 31b of the actuation rod 31 of the first embodiment.

(2) The distance between the inclined surfaces 40e of the clamping claw 40 as well as the distance between the inclined surfaces 50e formed on the cap 50 decreases in a downward direction of the rod 20.

(3) The cap 50 is not fixed to the rod 20.

Thus, in the blade mounting device 10 of this embodiment, the rod 20 is reciprocally driven in the same manner as the rod 21 of the first embodiment and includes a an axial hole 20a formed therein. The axial hole 20a has right-hand thread hole 20c formed in a position adjacent the lower end of the rod 20. A circular flange 20e is formed on the lower end of the rod 20 and includes a pair of diametrically confronting support walls 20d extending downwardly from the flange 20e and spaced from each other by a predetermined distance. The axial hole 20a is opened in the center of the flange 20e and between the support walls 20d.

The clamping claw 40 has a cylindrical shaft portion 40a having one end on which a pair of confronting claw portions 40b are formed in a fork like manner. The claw portions 40b have flat surfaces on the sides confronting each other. The inclined surfaces 40e are formed on the opposite sides of the flat surfaces and are inclined relative to the axial direction of the cylindrical shaft portion 40a such that the distance between the inclined surfaces 40d decreases in the downward direction. A recess 40f is formed on the cylindrical shaft portion 40a at a position between the claw portions 40b to provide resiliency of the claw portions 40b. In addition, a slit 40d is formed in each of the claw portions 40b in a central position in a widthwise direction and extending in the longitudinal direction of the claw portion 40b. The slit 40d serves to provide further resiliency of the claw portions 40b since each of the claw portions 40b are divided into substantially two parts. The width of the claw portions 40b is determined such that the claw portions 40b are insertable between the support walls 20d. The cylindrical shaft portion 40a is axially slidably inserted into the axial hole 20a of the rod 20 and has a left-hand thread hole 40c formed in the upper end. With the cylindrical shaft portion 40a axially movably inserted into the axial hole 20a of the rod 20 and with the claw portions 40b inserted between the support walls 20d, the left-hand thread 30b of the actuation rod 30 is screwed into the left-hand thread 40c of the cylindrical shaft portion 40c.

The actuation rod 30 having the right-hand thread part 30a and the left-hand thread part 30b on the same axis is inserted into the rod 20. The left-hand thread part 30b has a diameter smaller than the diameter of the right-hand thread part 30a and is positioned downwardly thereof. A semicircular rod portion 30c corresponding to the semicircular rod portion 31c of the first embodiment is formed on an upper portion of the actuation rod 30. The actuation rod 30 is inserted into the axial hole 20a of the rod 20 from the upper side, and the right-hand thread part 30a is engaged with the right-hand thread hole 20c such that the left-hand thread part 30b is positioned beyond the thread hole 20c and is screwed into the left-hand thread hole 40c of the clamping claw 40c.

With this construction, when the actuation rod 30 is rotated in the right-hand direction through operation of the operation mechanism 60 as described in connection with the first embodiment, the actuation rod 30 is moved downwardly relative to the rod 20 due to the screwing movement of the right-hand thread part 30a into the right-hand thread hole 20c, while the clamping claw 40 is moved downwardly relative to the actuation rod 30 due to the anti-screwing movement of the left-hand thread part 30b against the left-hand thread hole 40c of the clamping claw 40 since the clamping claw 40 is prevented from rotation.

Thus, the clamping claw 40 is moved downwardly by a distance corresponding to the sum of the distance of movement of the actuation rod 30 relative to the rod 20 and the distance of movement of the clamping claw 40 relative to the actuation rod 30, so that the clamping claw 40 is moved a greater distance for quickly clamping the blade B by slightly rotating the actuation rod 30.

On the other hand, when the actuation rod 30 is rotated the left-hand direction, the actuation rod 30 is moved upwardly relative to the rod 20 due to the anti-screwing movement of the right-hand thread part 30a against the right-hand thread hole 20c, while the clamping claw 40 is moved upwardly relative to the actuation rod 30 due to the screwing movement of the left-hand thread part 30b into the left-hand thread hole 40c, so that the clamping claw 40 is moved a greater distance for quickly releasing the blade B by slightly rotating the actuation rod 30.

Figure 5:
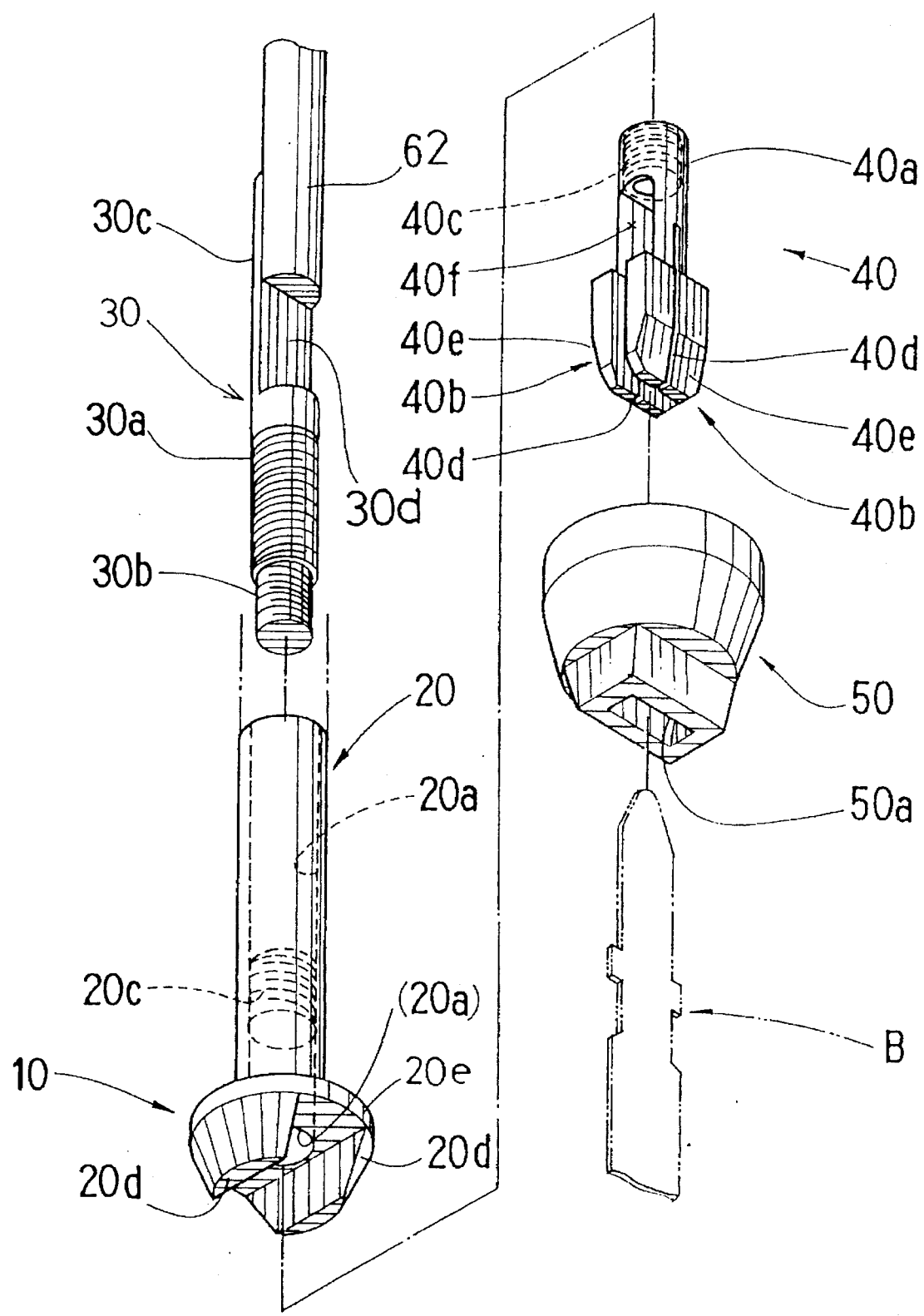
FIG. 5 is an exploded perspective view of a blade mounting device according to a second embodiment of the present invention.
Figure 6:
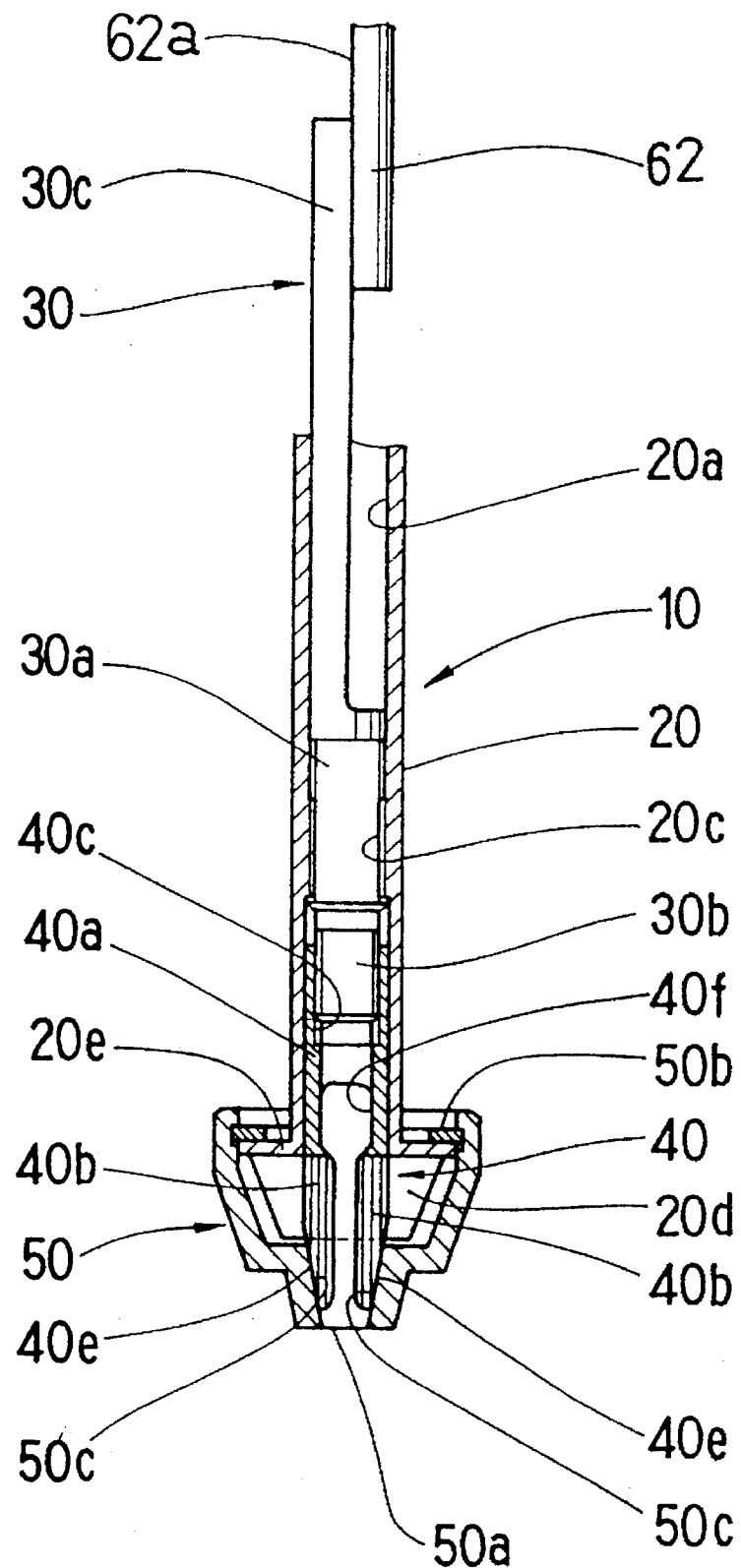
FIG. 6 is a front sectional view of the blade mounting device shown in FIG. 5.

The construction of the cap 50 will now be explained. The cap 50 serves to hold the clamping claw 40 between the support walls 20d at the lower end of the rod 20. As shown in FIG. 5, the cap 50 has substantially cup-shaped configuration to cover the lower portion of the clamping claw 40. An inserting hole 50a is formed in the central portion of the cap 50 for inserting the head of the blade B. As shown in FIG. 6, the cap 50 has an open top which is positioned on the opposite side of the inserting hole 50a and is closed by the flange 20e of the rod 20. A stop ring 50b is interposed between the peripheral portion of the upper surface of the flange 20e and an inner peripheral portion of the open top of the cap 50, so that the cap 50 is mounted on the rod 20 while the cap 50 accommodates the support walls 20d and the clamping claw 40 therewithin.

The inclined surfaces 50c are formed in the cap 50 in a position adjacent the inserting hole 50a and confront each other. The inclined surfaces 50c are inclined in the same direction as the inclined surfaces 40e of the claw portions 40b, so that the distance between the inclined surfaces 40e are decreased in the downward direction. Thus, through cooperation between the inclined surfaces 40e and 50c, the claw portions 40b are forced to be closed when the clamping claw 40 moves downwardly, and the claw portions 40b resiliently recover the open position when the clamping claw 40 moves upwardly.

Figure 7:
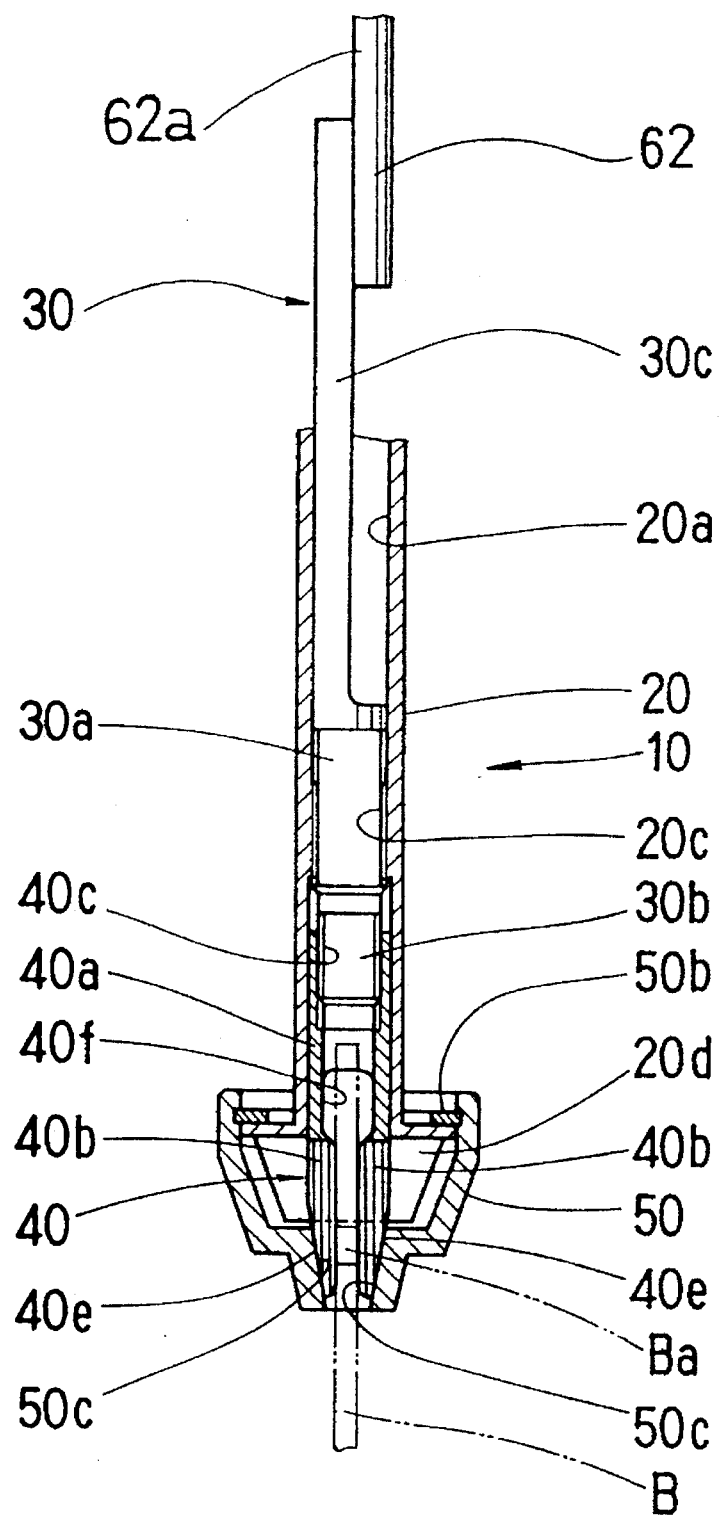
FIG. 7 is a view similar to FIG. 6 but showing the operation for clamping a blade.
Figure 8:
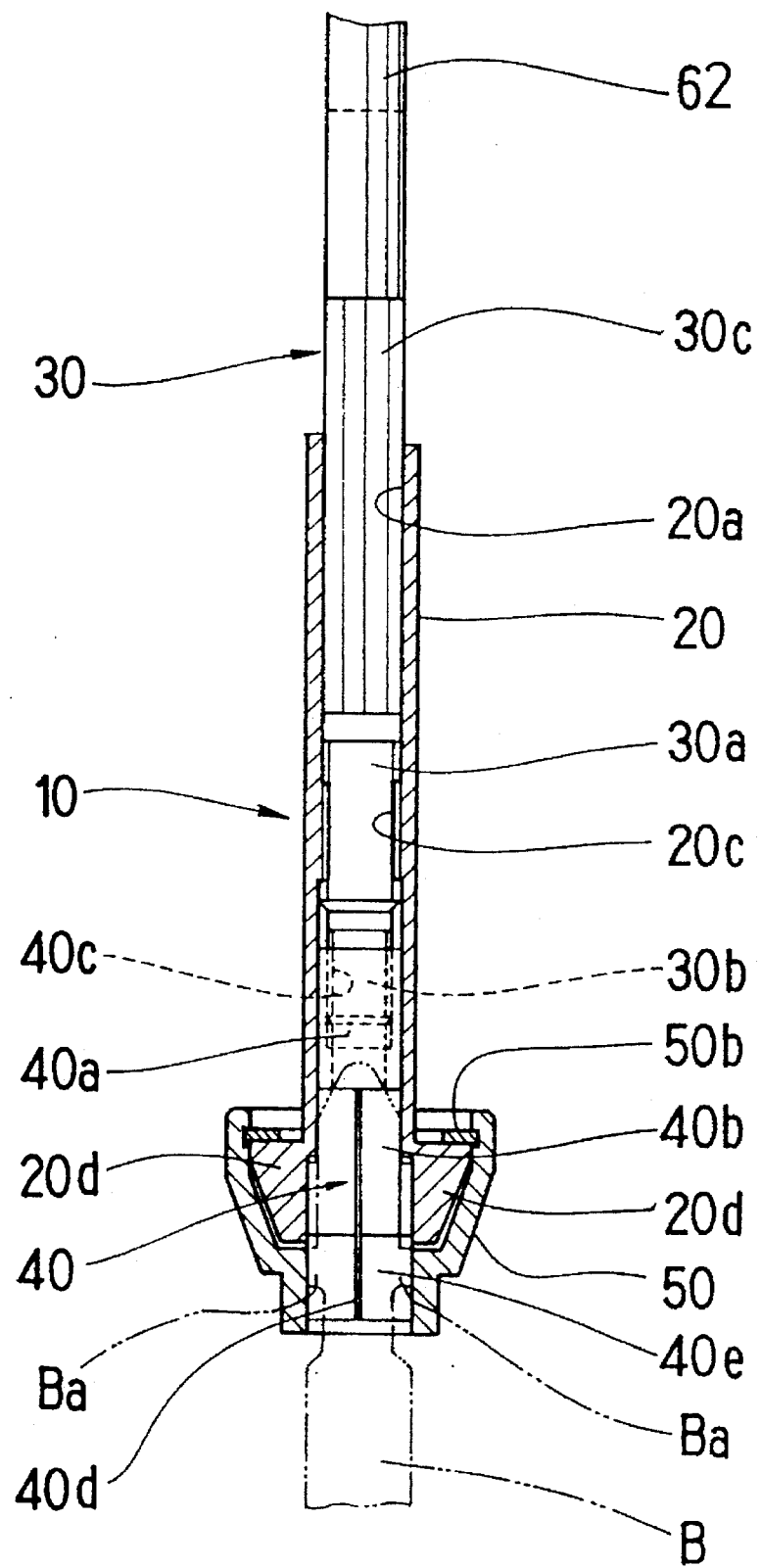
FIG. 8 is a side sectional view of FIG. 7.

Thus, operation for mounting and removing the blade B will now be explained with reference to FIGS. 6 to 8.

When the blade B is not mounted, the mounting device 10 is in a position shown in FIG. 6. where the clamping claw 40 is moved upwardly and the claw portions 40b are opened. In this position, the blade B is inserted between the claw portions 40b through the inserting hole 50a. Then the operation mechanism 60 is operated to rotate the actuation rod 30 in the right-hand direction, so that the clamping claw 40 is moved downwardly relative to rod 20 as described above. Here, the rotation of the clamping claw 40 is prevented by the support walls 20d. As the clamping claw 40 is thus moved downwardly, the claw portions 40b are moved to be closed through cooperation between the inclined surfaces 40e and 50c, so that the head of the blade B is clamped as shown in FIGS. 7 and 8.

In order to remove the blade B, the operation mechanism 60 is operated to rotate the actuation rod 30 in the left-hand direction, so that the clamping claw 40 is moved upwardly, and that the claw portions 40b resiliently recovers the open position.

Figure 9:
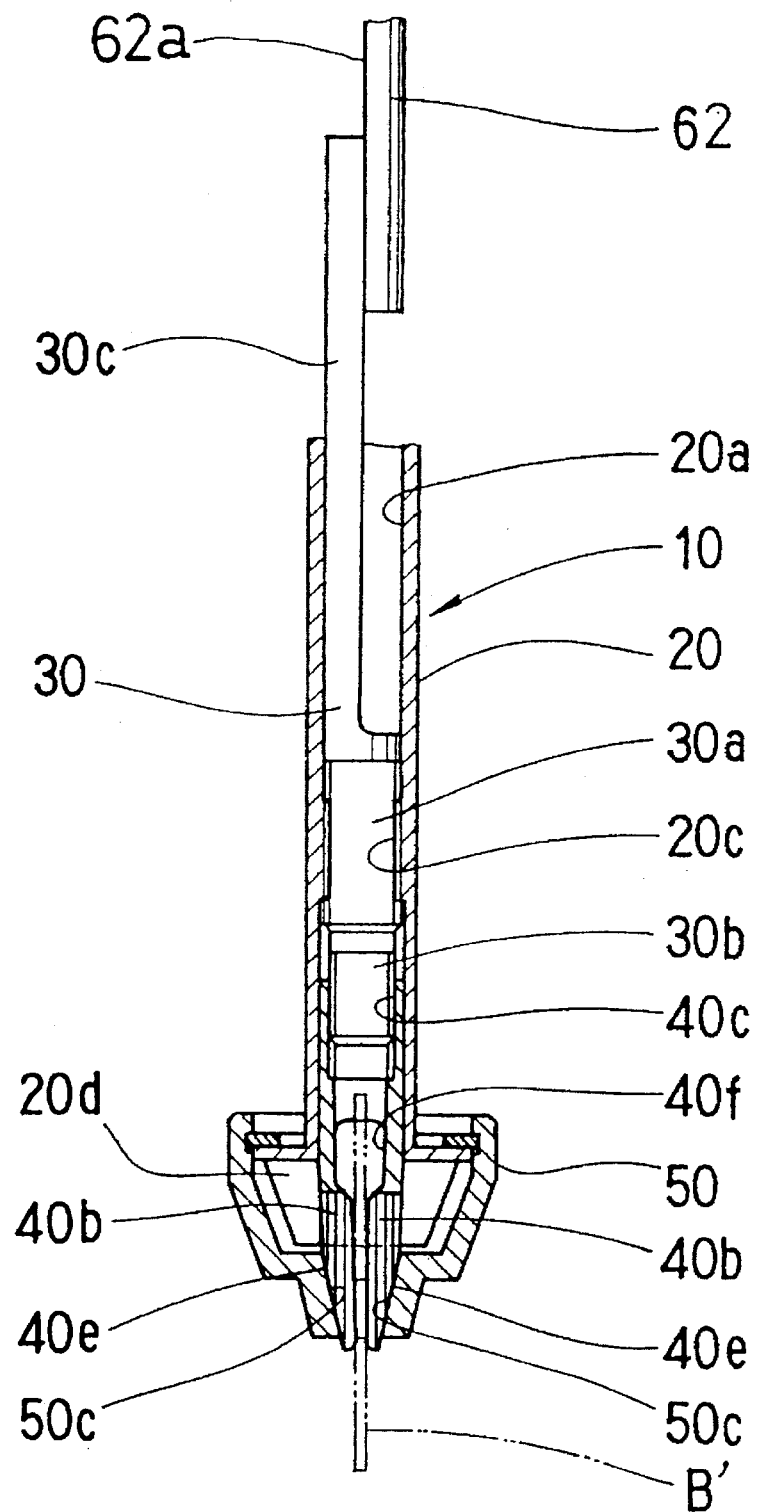
FIG. 9 is a view similar to FIG. 7 but showing the operation for clamping a blade having a smaller thickness.

The blade mounting device 10 can cope with various kinds of blades having different thickness as described in connection with the blade clamping device 11 of the first embodiment. FIG. 9 shows the clamping state of a blade B' which has a smaller thickness than the blade B shown in FIGS. 7 and 8.

Although two different embodiments of the blade mounting device have been described, the blade mounting device 11 of the first embodiment includes the following improvements compared with the second embodiment:

The cap 51 of the first embodiment has a rectangular tubular configuration and is fixedly mounted on the rod 21. Thus, the cap 51 does not require a mounting member such as the stop ring 50b of the second embodiment. Therefore, the mounting device 11 is compact and simple in construction and uses a reduced number of parts. Further the mounting device 11 can be easily assembled and can be manufactured at lower cost.

In addition, the cap 51 has two pairs of confronting walls, one forming the inclined surfaces 51c and the other constituting the inner walls 51d with which lateral surfaces of each claw portion 41b slidably contact. Thus, the inner walls 51d serve as the support walls 20d of the second embodiment. Therefore, the construction of the mounting device 11 of the first embodiment is further simplified.

A third embodiment of the present invention will now be described with reference to FIG. 10.

This embodiment is a modification of the second embodiment. Like members are given the same reference numerals and their description will not be repeated.

In this embodiment, a claw 70 and a claw 71 which are separated from each other are incorporated to clamp and release the blade B through movement of the claws 70 and 71 in opposite directions. Here, the claws 70 and 71 correspond to the claw portions 40b of the clamping claw 40 of the second embodiment if the claw portions 40b are divided along the central axis of the cylindrical shaft portion 40a. Thus, each of the claws 70 and 71 has a semi-cylindrical tubular upper part. A right-hand thread hole 70a having a semi-circular configuration in section is formed in the upper part of the claw 70. A left-hand thread hole 71a having a semi-circular configuration in section is formed in the upper part of the claw 71 and is positioned downwardly of the thread hole 70a.

An actuation rod 80 has a right-hand thread part 80a in engagement with the right-hand thread hole 20c of the rod 20. A left-hand thread part 80b is formed on the actuation rod 80 in a position downwardly of the thread part 80a and is in engagement only with the left-hand thread hole 71a of the claw 71.

The claw 70 includes a lower portion having an inclined surface 70b formed on an outer surface opposite to the claw 71. The inclined surface 70b is downwardly outwardly inclined relative to the axis of the rod 20 or inclined in the open direction. The claw 71 includes a lower portion having an inclined surface 71b is formed on an outer surface opposite to the claw 70. Similar to the inclined surfaces 40e of the second embodiment, the inclined surface 71b is downwardly inwardly inclined relative to the axis of the rod 20. A cap 90 has inclined surfaces 90a and 90b which face the inclined surfaces 70b and 71b, respectively, and which are inclined in the same manner as these surfaces 70b and 71b, respectively, so that the inclined surface 70b of the claw 70 slidably contacts the inclined surface 90a, while the inclined surface 71b of the claw 71 slidably contacts the inclined surface 90b.

Figure 10:
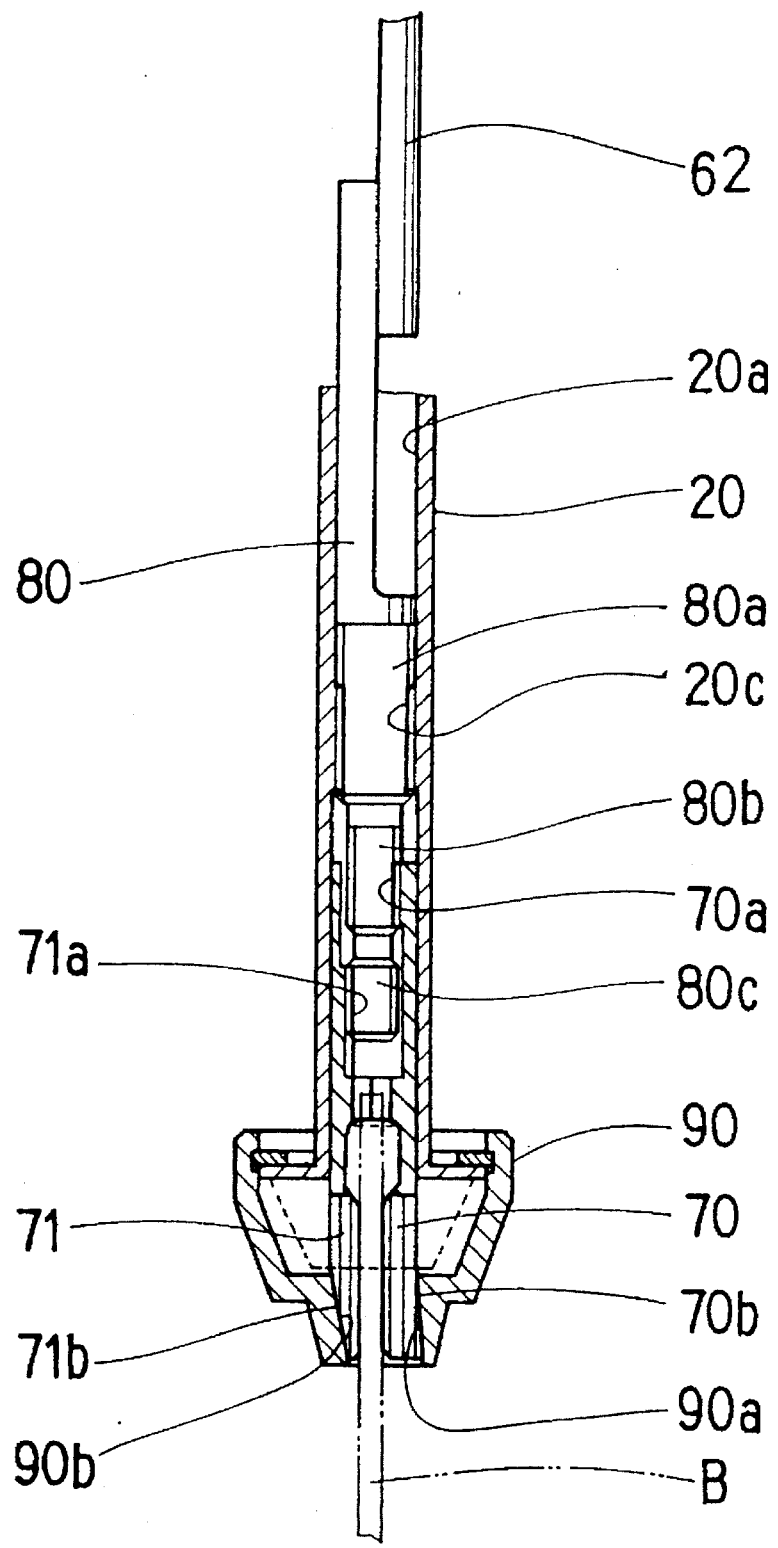
FIG. 10 is a front sectional view of a blade mounting device according to a third embodiment of the present invention.

With this construction, when the actuation rod 80 is rotated in the right-hand direction in the same manner as the above embodiments, the actuation rod 80 is moved downwardly through the screwing movement of the right-hand thread part 80a into the right-hand thread hole 20c, while the claw 70 positioned on the right side in FIG. 10 is moved upwardly relative to the actuation rod 80. The pitch (lead) of the left-hand thread part 80b is determined to have a greater distance than the pitch of the right-hand thread part 80a, so that the claw 70 moves upwardly relative to the rod 20. As the claw 70 is thus moved upwardly, the claw 70 is moved toward the closing position through cooperation between the inclined surface 70b and the inclined surface 90a of the cap 90. On the other hand, the claw 71 positioned on the left side is moved downwardly relative to the actuation rod 80 by the anti-screwing movement of the left-hand thread part 80c against the left-hand thread hole 71a, so that the claw 71 is moved downwardly by a distance corresponding to the sum of the moving distance of the actuation rod 80 relative to the rod 20 and the moving distance of the claw 71 relative to the actuation rod 80. As the claw 71 is moved downwardly, the claw 71 is moved toward the closing position through cooperation between the inclined surface 71b and the inclined surface 90b of the cap 90. As the result, the claws 70 and 71 are closed by slightly rotating the actuation rod 80, so that the blade B inserted between the claws 70 and 71 are clamped.

As described above, also with the blade mounting device of the third embodiment, the blade B can be mounted and released without using a special hand tool, the device can cope with various kinds of blades, and the mounting and removing operation of the blade can be easily performed.

With the above second and third embodiments, the same modifications as described in the first embodiment can be incorporated.

Thus, two thread parts formed on the actuation rod may have different pitches from each other, and both the thread parts may have the same threaded direction while having different pitches from each other. The blade B may be clamped and released when the operation knob 61 is rotated in the left-hand direction and the right-hand direction, respectively. Further, the blade mounting device may include only one of improvements of the provision of the two thread parts on the actuation mechanism and the provision of the clamping claw.

While the invention has been described with reference to preferred embodiments thereof, it is to be understood that modifications or variations may be easily made without departing from the spirit of this invention which is defined by the appended claims.

What is claimed is:

1. A blade mounting device for mounting a blade on a movable member of a reciprocating cutting tool said cutting tool having a body, a motor for reciprocally linearly driving the movable member in an axial direction, the blade is moved in a predetermined motion for a cutting operation, said blade mounting device comprising:

a pair of claws adapted to be mounted on the movable member and operable between a closed position for clamping the blade and an open position for releasing the blade; and actuation means operable by an operator for moving said claws between said closed position and said open position;

said actuation means includes an actuation member rotatably operable by the operator and motion conversion means for converting the rotational movement of said actuation member into the movement of said claws between said open and said closed positions;

a rotary member being operably connected to said actuation member, so that said actuation member is slidably movable relative to said rotary member in the axial direction of the movable member while said actuation member is rotatable together with said rotary member.

2. The blade mounting device as defined in claim 1 further including biasing means for biasing said claws toward said open position when said rotary member is not operated.

3. The blade mounting device as defined in claim 1 wherein the claws in said closed position are adapted to clamp the blade in the direction of its thickness.

4. The blade mounting device as defined in claim 1 wherein said claws are formed integrally with each other and are resiliently shiftable between said open position and said closed position, and wherein said claws are held in said open position when said rotary member is not operated.

5. The blade mounting device as defined in claim 1 wherein:

said actuation member is adapted to be inserted into the movable member which is a tubular rod;

said claws are to be disposed within one end portion of said tubular rod and are movable toward and away from each other in a radial direction of said tubular rod between said closed position and said open position; and said motion conversion means includes thread means for converting the rotational movement of said actuation member into the movement of said claws in an axial direction of said tubular rod, and cam means for converting the axial movement of said claws into their radial shifting movement.

6. The blade mounting device as defined in claim 5 wherein:

said claws are adapted to be axially movable mounted in said tubular rod while said claws are prevented from rotation relative to said tubular rod; and said thread means includes first thread means disposed between said actuation member and said tubular rod for converting the rotation of said actuation member into an axial movement of said actuation member relative to said tubular rod; and second thread means disposed between said actuation member and said claws for converting the rotation of said actuation member into an axial movement of said claws relative to said tubular rod and said actuation member.

7. The blade mounting device as defined in claim 6 wherein said first thread means and said second thread means are operable to convert rotation of said actuation member into the axial movement of said actuation member and said claws in the same direction.

8. The blade mounting device as defined in claim 6 wherein one of said first and said second thread means is a right-hand thread and the other of said first and said second thread means is a left-hand thread.

9. The blade mounting device as defined in claim 5 wherein said cam means includes first inclined surfaces formed on one end of said tubular rod, said first inclined surfaces confronting each other, and each of said claws having an outer surface formed as a second inclined surface, said second inclined surface facing said first inclined surface, said first inclined surface and said second inclined surface being inclined at the same angle relative to an axis of said tubular rod.

10. The blade mounting device as defined in claim 9 wherein the claws are fixed together by a shaft portion to be slidably inserted into said tubular rod and the claws are resiliently shiftable in a radial direction of said tubular rod.

11. The blade mounting device as defined in claim 9 wherein:

said one end of said tubular rod includes a tubular member secured thereto for accommodating said claws;

said tubular member includes a first pair of inner walls confronting in a diametrical direction, said inner walls forming first inclined surfaces said tubular member further includes a second pair of inner walls confronting in a diametrical direction perpendicular to the diametrical direction of said first pair of inner walls;

said second pair of inner walls restrain the position of said claws in a direction perpendicular to the direction of movement of said claws to be opened and closed; and said second pair of inner walls cooperate with said first pair of inner walls for preventing said claws from rotation relative to said tubular rod.

12. The blade mounting device as defined in claim 9 wherein one end of said tubular rod includes a flange secured thereto, said flange having a pair of diametrically confronting wall portions for restraining the position of said claws in a direction perpendicular to the direction of movement of said claws to be opened and closed, and wherein said one end of said tubular rod includes a cover mounted on said flange for accommodating said claws, said cover having surfaces inclined in the same direction as the first inclined surfaces of the cam means.

13. The blade mounting device as defined in claim 5 wherein:

said claws comprise a first claw and a second claw axially movable relative to said tubular rod independently of each other and prevented from rotation relative to said tubular rod; and said thread means includes a first thread means disposed between said actuation member and said tubular rod for converting rotation of said actuation member into an axial movement of said actuation member relative to said tubular rod;

a second thread means disposed between the actuation member and said first claw and said second claw for converting the rotation of said actuation member into an axial movement of said first claw and said second claw relative to said actuation member;

said second thread means including first claw thread means and second claw thread means disposed between said actuation member and said first claw and between said actuation member and said second claw, respectively;

said first claw thread means and said second claw thread means being operable to convert the rotation of said actuation member into axial movement of said first claw and said second claw in opposite directions; and said cam means converting the opposite directions axial movement of said first claw and said second claw into the movement of the first claw and the second claw between said open position and said closed position.

14. The blade mounting device as defined in claim 13 wherein said first claw thread means of said second thread means has a pitch greater than a pitch of said first thread means.

15. A blade mounting device for mounting a blade on a movable member of a cutting tool which is moved in a predetermined motion for a cutting operation, comprising:

holder means mounted on the movable member and movable relative to the movable member in an axial direction between a first position to hold the blade and a second position to release the blade;

actuation means operable by an operator for operating said holder means;

said actuation means including:

an actuation member rotatably operable by the operator; and thread means for converting the rotational movement of said actuation member into an axial direction movement of said holder means;

said thread means including:

first thread means disposed between said actuation member and the movable member for converting the rotation of said actuation member into the axial direction movement of said actuation member relative to the movable member; and second thread means disposed between said actuation member and said holder means for converting the rotation of said actuation member into the axial direction movement of said holder means relative to said actuation member.

16. The blade mounting device for mounting a blade on a movable member of a cutting tool as defined in claim 15, wherein the cutting tool is a reciprocating cutting tool having a body and a motor for reciprocally linearly driving the movable member in its axial direction, and a rotary member manually rotatably by the operator, said rotary member being operably connected to said actuation member, so that said actuation member is slidably movable relative to said rotary member in the axial direction of the movable member while said actuation member is rotatable together with said rotary member.

17. The blade mounting device for mounting a blade on a movable member of a cutting tool as defined in claim 16 wherein:

said actuation member has a tubular configuration;

the movable member is a tubular rod for receiving said actuation member coaxially therewith;

said holder means includes a shaft axially slidably inserted into said tubular rod and having an axial hole;

said first thread means includes a first male thread formed on an outer surface of said actuation member and a first thread hole formed in said tubular rod and in engagement with said first male thread; and said second thread means includes a second male thread axially displaced from said first male thread and a second thread hole formed in said axial hole of said shaft of said holder means and in engagement with said second male thread.

18. The blade mounting device as defined in claim 17 wherein said holder means includes a first holder member and a second holder member cooperating with each other to clamp a blade, and wherein said first holder member and said second holder member are connected to each other by said shaft.

19. The blade mounting device as defined in claim 15 wherein said first thread means and said second thread means are operable to convert rotation of said actuation member into the axial direction movement of said actuation member and said holder means in the same direction.

20. The blade mounting device as defined in claim 19 wherein one of said first and said second thread means is a right-hand thread and the other of said first and said second thread means is a left-hand thread.

21. The blade mounting device as defined in claim 15 wherein:

said holder means includes a first holder member and a second holder member cooperating with each other to clamp a blade, and axially slidably movable relative to the movable member independently of each other;

said second thread means includes:

first holder thread means for converting the rotation of said actuation member into an axial movement of said first holder member; and second holder thread means for converting the rotation of said actuation member into an axial movement of said second holder member;

said first holder thread means and said second holder thread means being operable to convert the rotation of said actuation member into the axial movement of said first and said second holder members in directions which are opposite to each other.

22. The blade mounting device as defined in claim 21 wherein said first holder thread means of said second thread means has a pitch greater than the pitch of said first thread means.

* * * * *